United States Patent

Tomiyoshi et al.

[11] Patent Number: 5,267,628
[45] Date of Patent: Dec. 7, 1993

[54] STEERING WHEEL POSITION COMPENSATOR OF FULLY HYDRAULIC STEERING SYSTEM

[75] Inventors: Yasumasa Tomiyoshi; Toshiro Nozawa, both of Saitama, Japan

[73] Assignees: Kabushiki Kaisha Komatsu Seisakusho; Komatsu Mec Kabushiki Kaisha, Tokyo, Japan

[21] Appl. No.: 773,669
[22] PCT Filed: Apr. 17, 1990
[86] PCT No.: PCT/JP90/00498
 § 371 Date: Oct. 17, 1991
 § 102(e) Date: Oct. 17, 1991
[87] PCT Pub. No.: WO90/12725
 PCT Pub. Date: Nov. 1, 1990

[30] Foreign Application Priority Data

Apr. 18, 1989 [JP] Japan .................................. 1-96242
Sep. 27, 1989 [JP] Japan .................................. 1-112123

[51] Int. Cl.⁵ .............................................. B62D 5/06
[52] U.S. Cl. ............................... 180/139; 180/132; 180/141; 180/152
[58] Field of Search ............... 180/132, 134, 139, 141, 180/152, 162; 280/442, 432

[56] References Cited

U.S. PATENT DOCUMENTS

| | | | |
|---|---|---|---|
| 4,081,054 | 3/1978 | Yates | 180/139 |
| 4,106,792 | 8/1978 | Schultz et al. | 280/432 |
| 4,365,685 | 12/1982 | Ratsko et al. | 180/135 |
| 4,688,818 | 8/1987 | Grassmuck | 280/432 |
| 4,763,916 | 8/1988 | Ratsko et al. | 280/432 |
| 5,020,618 | 6/1991 | Nagao | 180/132 |

FOREIGN PATENT DOCUMENTS

| | | | |
|---|---|---|---|
| 3808866 | 10/1988 | Fed. Rep. of Germany | 180/141 |
| 0081256 | 5/1984 | Japan | 180/132 |
| 60-261779 | 12/1985 | Japan . | |
| 61-143263 | 6/1986 | Japan . | |
| 0301178 | 12/1988 | Japan | 180/132 |

Primary Examiner—Margaret A. Focarino
Assistant Examiner—Anne Boehler
Attorney, Agent, or Firm—Flynn, Thiel, Boutell & Tanis

[57] ABSTRACT

A steering wheel position compensator of a fully hydraulic steering device for working vehicle, etc. In a fully hydraulic power steering device provided with a steering unit (30) operated by a steering wheel (H) and a hydraulic circuit connecting steering cylinders (D, E) that turn the car body, a sensor (110) that detects the turning angle of the steering wheel, a sensor (120) that detects the turning angle of the car body, a controller (101) that compares the outputs of these two sensors to actuate a steering wheel position deviation compensation solenoid valve (50) in accordance with the difference between the outputs of these sensors, a compensation flow distribution valve (60) that branches off the steering wheel position compensation oil from a steering pump circuit to the solenoid valve (50), and a compensation circuit closing valve (40) that closes the drain port of the pilot hydraulic circuit of the flow distribution valve (60) only when the steering wheel is operated by a driver and allows the flow distribution valve (60) to supply the compensation oil to the solenoid valve (50), are provided.

3 Claims, 8 Drawing Sheets

STEERING WHEEL POSITION COMPENSATOR OF FULLY HYDRAULIC STEERING SYSTEM

TECHNICAL FIELD

The present invention relates to a steering system of a vehicle such as a wheel loader, a forklift truck and the like, particularly to a fully hydraulic steering device having no mechanical links capable of preventing the deterioration of a steering operation property caused by gradual deviation of the steering wheel position when the vehicle travels straight and adapted for compensating deviation of the steering wheel position caused by frequent turning of the steering wheel.

BACKGROUND TECHNOLOGY

Figure 8:
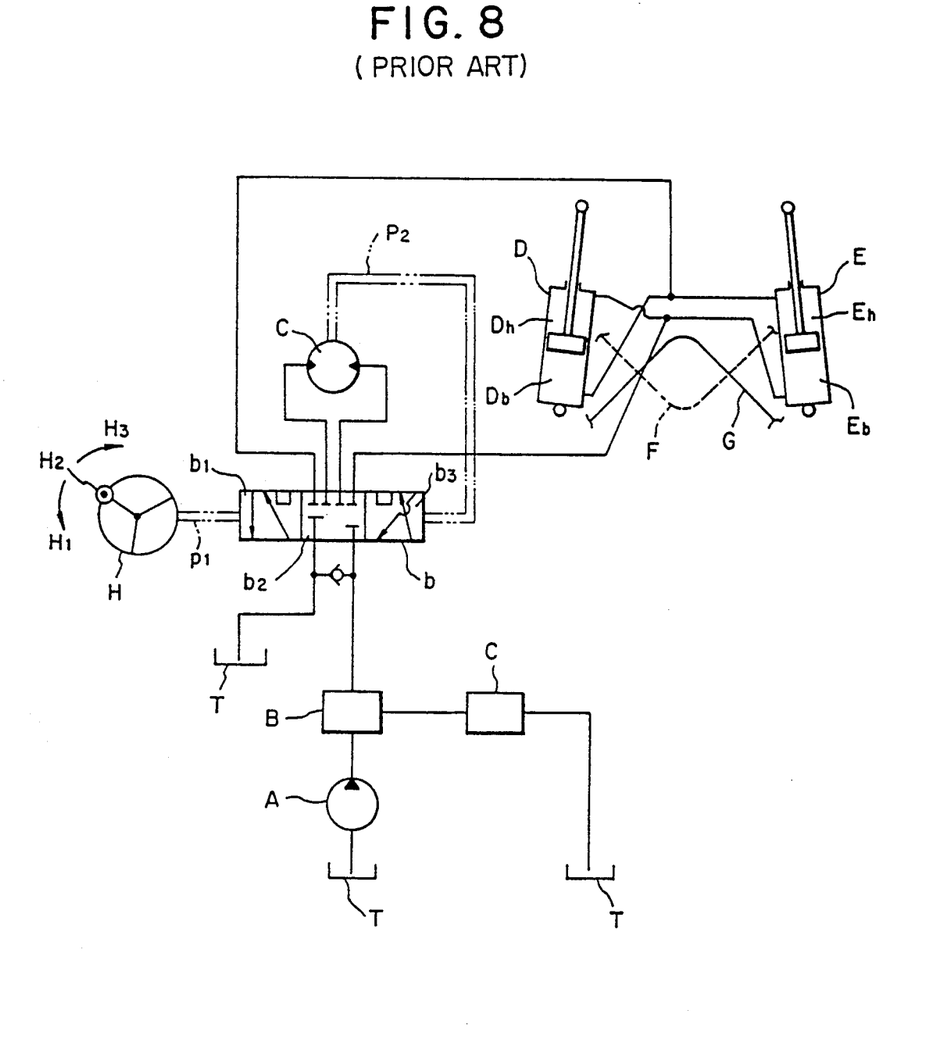
FIG. 8 is a circuit diagram of a conventional steering wheel position compensator of fully hydraulic steering system.

A conventional fully hydraulic steering system is illustrated in FIG. 8.

In the same figure, when a steering wheel H is operated from a straight position $H_2$ to a left turning direction $H_1$ or a right turning direction $H_3$, a directional control valve b is switched from a straight position $b_2$ to a left turning position $b_1$ or a right turning position $b_3$ so that a pressurized oil from a hydraulic pump A flows through a steering flow control valve B, the directional control valve b and a metering unit C and then returned to the directional control valve b. The pressurized oil thus returned to the directional control valve b enters a head side Dh of a left steering cylinder D and a bottom side Eb of a right steering cylinder E, in case of turning the steering wheel leftward and enters a bottom side Db of a left steering cylinder D and a head side Eh of a right steering cylinder E in case of turning the steering wheel rightward so that bodies F and G are turned relative to each other. The pressurized oil which entered the left steering cylinder D and the right steering cylinder E are returned to a tank T through the directional control valve b. In the same figure, designated at C is a working valve and $P_1$, $P_2$ as shown by two dotted chain lines illustrate that the directional control valve b and the metering unit c are operated by a steering wheel H.

In the conventional fully hydraulic steering system, since the steering wheel position is deviated due to leakage of internal oil in each hydraulic circuit, there is disclosed such a technique to compensate the position deviation as disclosed in Japanese Patent Laid-open Publication No. 60-261779. This technique is summarized as follows. The steering wheel position deviation is compensated by calculating a difference between an output of a steering wheel turning angle detecting means and an output of a steering cylinder stroke detecting means by a controller supplying a compensation signal to a solenoid operated directional control valve when an output difference therebetween exceeds a given value, draining oil from a drain oil line and racing the steering wheel so that the steering wheel position may match with the steering cylinder stoke.

However, there were the following serious problems in the conventional steering wheel position compensator.

(1) In case that the compensation operation is carried out when the position deviation occurred, the oil supplied from a steering unit (combination of the directional control valve b and the metering unit c as denoted in FIG. 8) to a steering cylinder is drained and a steering wheel is raced and compensated in the position. As a result, since the steering wheel is raced while the steering cylinder is not operated, a dead zone thereof increases so that there was a likelihood of occurring meandering when the car body travels straight.

(2) There occurred the inconvenience that the compensation was not effective when the steering wheel position is gradually deviated when the steering wheel is pressed by hands of an operator just before the directional control valve of the steering unit is operated as denoted b in FIG. 8 so as to prevent the car body from deviating slightly leftward or rightward when the car body travels straight.

It is therefore an object of the present invention to provide a steering wheel position compensator solving the problem of the conventional steering wheel position compensator of fully hydraulic steering system, improving the operation property and assuring reliability and safety with low cost.

DISCLOSURE OF THE INVENTION

To achieve the above object, the present invention is to provide a fully hydraulic steering system equipped with a steering wheel position compensator, comprising a sensor for detecting the turning angle of a steering wheel, a sensor for detecting the turning angle of the car body, a controller for comparing outputs of these two sensors to actuate a steering wheel position deviation compensation solenoid valve in response to the difference of these outputs, a compensation flow distribution valve for branching off a steering wheel position deviation compensation oil from a steering pump circuit and a compensation circuit closing valve that closes a drain port of the pilot hydraulic circuit of the flow distribution valve only when the steering wheel is operated by a driver and allows the flow distribution valve to supply the compensation oil to the solenoid valve.

With such an arrangement, when the steering wheel position deviation occurred in the entire range of the turning angle of the car body, i.e., the range covering from the leftward maximum turning angle to the rightward maximum turning angle, the deviation compensation oil is supplied from the steering wheel position deviation compensation solenoid valve toward the position compensation direction, thereby compensating the steering position deviation.

The steering wheel position deviation is also compensated even in the case where the steering unit does not supply the pressurized oil, the deviation compensation oil is supplied to a line between the steering unit and the steering cylinder. However, when the controller or the steering wheel position deviation compensation valve is broken and the steering wheel is not turned, the compensation circuit closing valve stops the flow of the deviation compensation oil at the flow distribution valve so that the safety is assured.

The fully hydraulic steering system according to another aspect of the present invention comprises a sensor for detecting the turning angle of the steering wheel, a sensor for detecting the turning of the angle of the car body, a controller for comparing the outputs of two sensors so as to actuate the steering wheel position deviation compensation solenoid valve whereby the deviation compensation oil is not supplied to the steering cylinders due to a load sensing function of a load sensing line of the steering flow control valve even if the controller issues a compensation signal when the driver does not turn the steering wheel. With such an arrangement, the compensation flow distribution valve

BEST MODE FOR CARRYING OUT THE INVENTION

Figure 1:
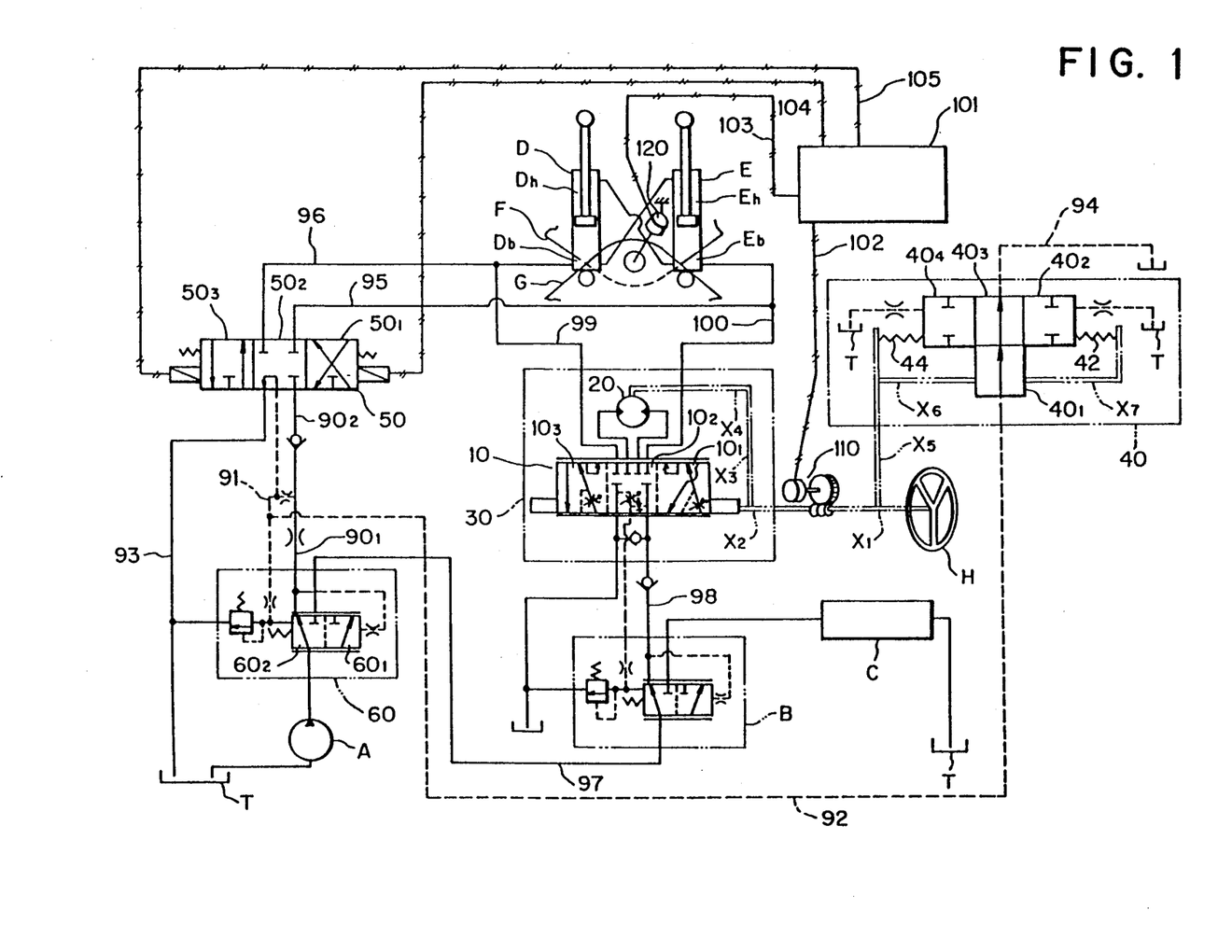
FIG. 1 is a hydraulic circuit diagram of a fully hydraulic steering system equipped with a steering wheel position compensator according to a first embodiment of the present invention.

FIG. 1 is a hydraulic circuit diagram showing a steering wheel position compensator of fully hydraulic steering system according to a first embodiment of the present invention.

In FIG. 1, the steering wheel H, the directional control valve 10, the metering unit 20 (a steering unit 30 is composed of the directional control valve 10 and the metering unit 20) and a compensation circuit closing valve 40 are connected to one another by two dotted and one dash lines $X_1$, $X_2$, $X_3$, $X_4$, $X_5$, $X_6$ and $X_7$ and respectively controlled by the steering wheel H.

Designated at 50 is a steering wheel position deviation compensation solenoid valve, 60 is a compensation flow distribution valve, $90_1$, $90_2$, 91, . . . , 100 are hydraulic pipes, 102, 103, 104, 105 are electric wires, 110 is a sensor for detecting the turning angle of the steering wheel and 120 is a sensor for detecting the turning angle of the car body.

An operation of the steering wheel position compensator according to the first embodiment of the present invention will be described hereinafter.

The operation of the compensation circuit closing valve 40 is first described. When the rotation of the steering wheel H is stopped, i.e. the steering wheel is not rotated, a spool $40_1$ and sleeves $40_2$, $40_3$, $40_4$ are centered by springs 42 and 44 provided at both ends of the sleeves $40_2$ and $40_4$ and the pressurized oil passed through a pilot hydraulic circuit 92 connected to the compensation flow distribution valve 60 is drained from the small hole of the spool $40_1$ and a small hole of the sleeve $40_3$, the spools $60_1$ and $60_2$ of the compensation flow distribution valve 60 are positioned at the spool $60_1$ by the pressurized oil supplied from the hydraulic pipe $90_1$ and substantially all the discharged oil from the pump A is supplied to the steering wheel, flow control valve B excepting the very small amount of the oil drained from the pilot hydraulic circuit 92. Accordingly, the steering wheel position is not compensated even if the steering wheel position deviation compensation solenoid valve 50 is positioned at a right compensation position $50_1$ or a left compensation position $50_3$.

That is, it is possible to operate the steering wheel even if the steering wheel position deviation compensation solenoid valve 50 does not work while it is positioned at the right compensation position $50_1$ or the left compensation position $50_3$. The operation of the compensation circuit closing valve 40 is summarized as follows. It is possible to prevent the car body from turning against the intention of the driver because the compensation oil is supplied to the steering wheel position deviation compensation solenoid valve 50 only when the driver turns the steering wheel and the compensation oil is not supplied to the steering wheel position deviation compensation solenoid valve 50 when the driver does not operate the steering wheel.

Figure 3:
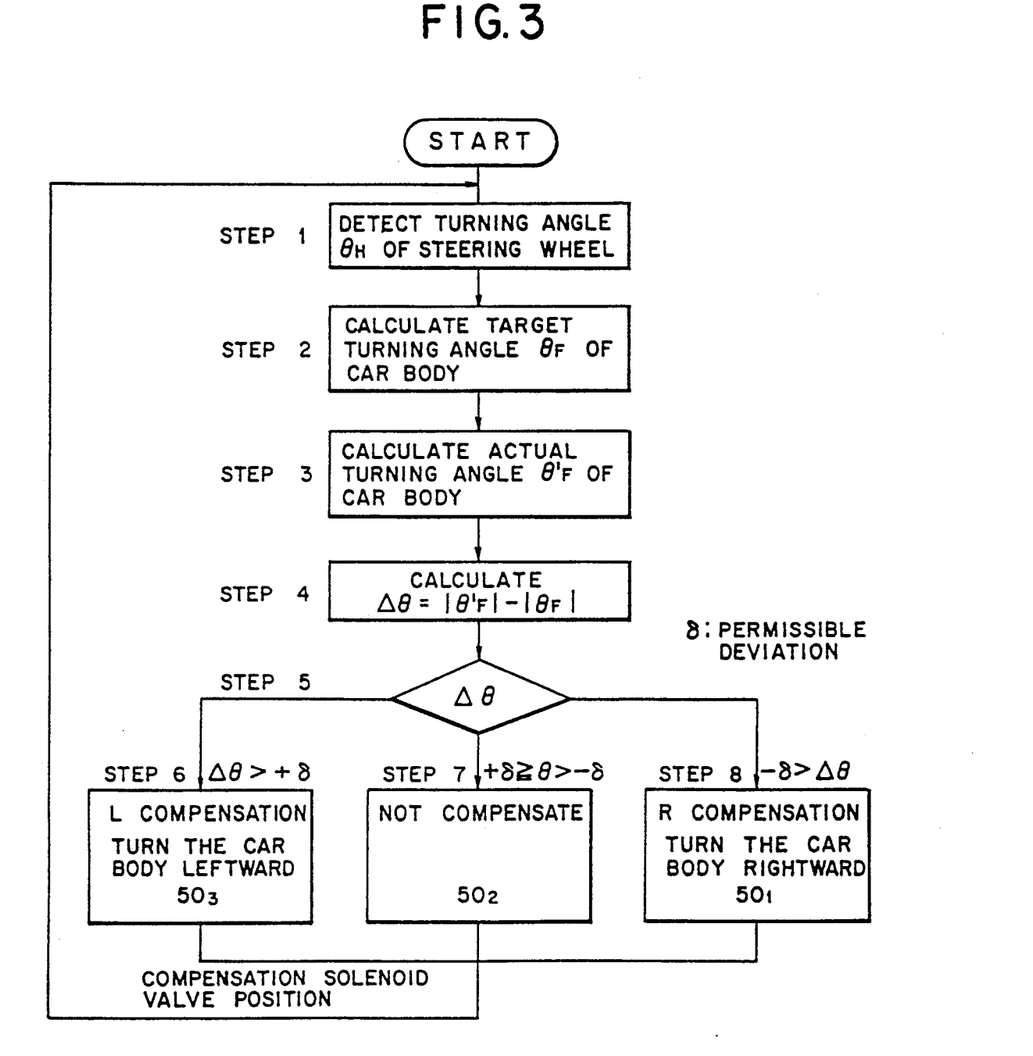
FIG. 3 is a flowchart showing an operation of a controller.

The operation of the compensation circuit will be described with reference to the flowchart showing the control by the controller 101 as illustrated in FIG. 3.

Step 1: detecting the turning angle $\theta_H$ of the steering wheel by the sensor 110 for detecting the turning angle of the steering wheel and supplying the detected steering angle to the controller 101.

Step 2: calculating a target turning angle of the body $\theta_F$ based on the detected steering angle $\theta_H$ of the steering wheel.

Step 3: detecting an actual turing angle of the car body $\theta_F'$ by a sensor 120 for detecting the turning angle of the car body and supplying the detected angle to the controller 101.

Step 4: detecting the difference $\Delta\theta$ between the target turning angle $\theta_F$ of the car body and the actual turning angle $\theta_F'$ of the car body. It is expressed as follows. $\Delta\theta = \theta_F - \theta_F'$.

Figure 4:
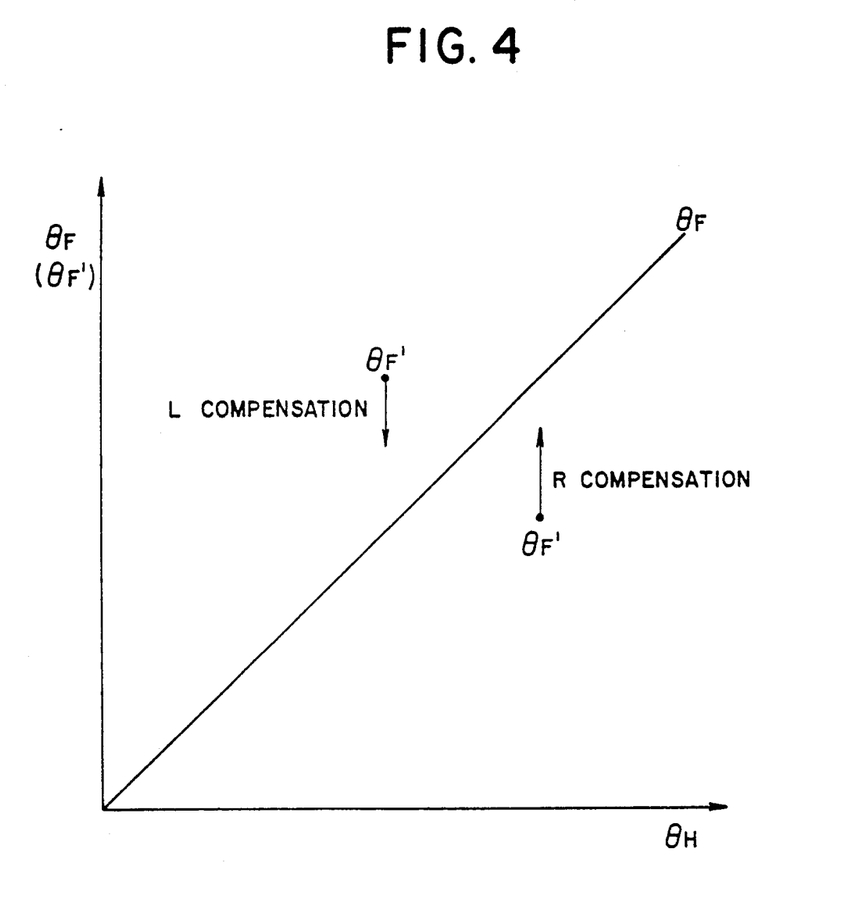
FIG. 4 is a graph showing the relation between a compensation direction of a target turning angle of a car body and an actual turning angle of the car body.
Figure 6:
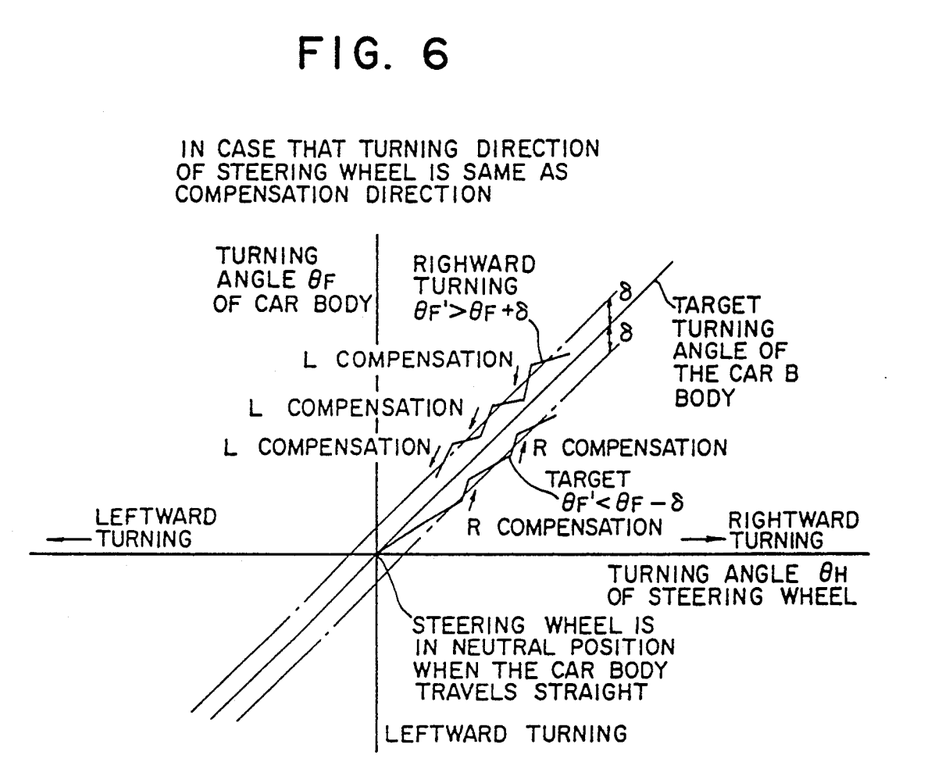
FIG. 6 is a graph showing the relation in detail which is illustrated in FIG. 4.

Step 5: comparing the deviation $\Delta\theta$ and a permissible deviation $\delta$ of the turning angle of the car body to determine the necessity of the compensation and the direction of the compensation (also refer to FIGS. 4 and 6).

Step 6: turning the car body leftward by positioning the steering wheel position deviation compensation solenoid valve 50 in the left compensation position since the deviation is greater than the upper limit of the permissible deviation if the formula $\Delta\theta > \delta$ is established.

Step 7: not compensating the deviation since it is within the permissible deviation if the formula $$+\delta \geq \Delta\theta \geq -\delta$$

is established.

Step 8: turning the car body rightward by positioning the steering wheel position deviation compensation solenoid valve 50 in the right compensation position since the deviation is greater than the lower limit of the permissible deviation limit if the formula $-\delta > \Delta\theta$ is established.

Figure 5:
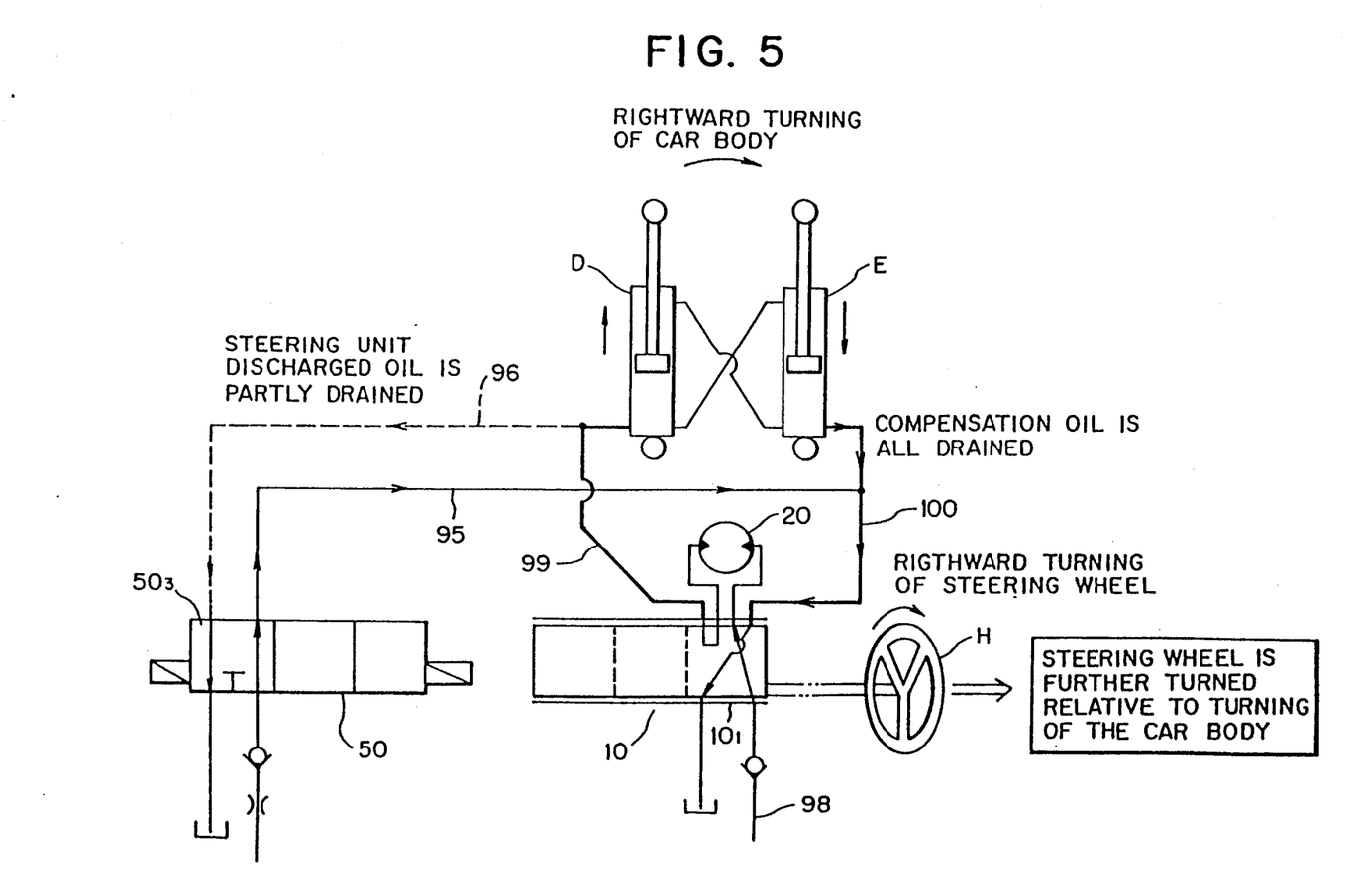
FIG. 5 is a hydraulic circuit diagram of a main portion of the steering wheel position compensator of fully hydraulic steering system according to the present invention as illustrated in FIGS. 1 and 2 wherein the turning direction of a steering wheel is reverse to the compensation direction.
Figure 7:
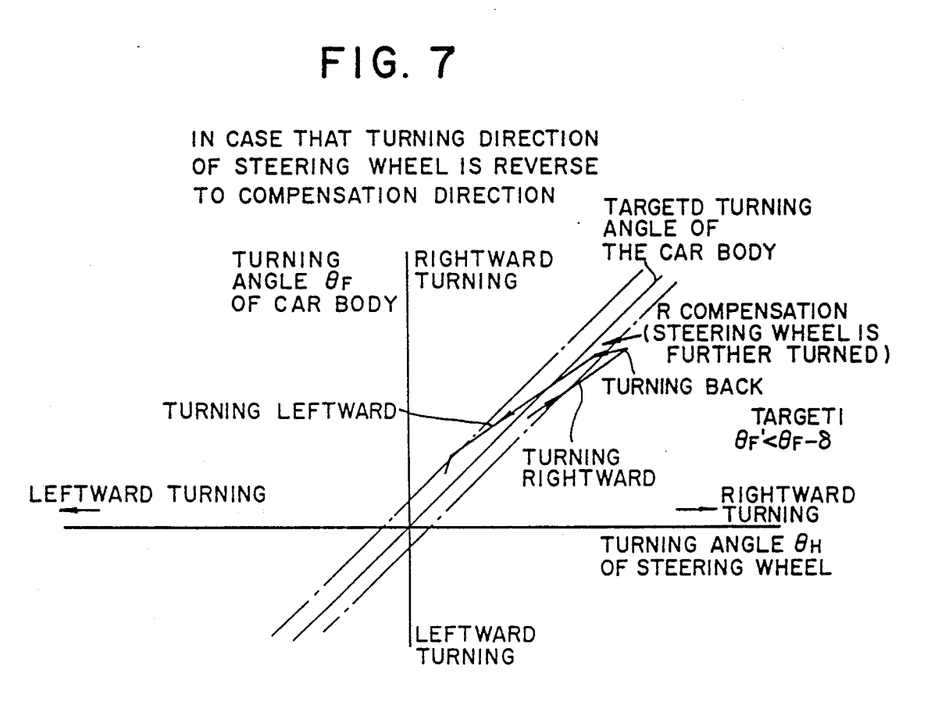
FIG. 7 is a graph showing the relation in detail between the compensation direction and the actual turning direction of the steering wheel which is illustrated in FIG. 5.

In case that the turning angle of the steering wheel is reverse to that of the compensation angle as illustrated in FIGS. 5 and 7, the compensation oil supplied from the steering wheel position deviation compensation solenoid valve 50 to the steering wheel cylinders D and E are all drained from the steering unit 30. As a result, there is no likelihood that the car body is turned in the direction reverse to the turning direction of the steering wheel H.

Furthermore, since the oil discharged from the steering unit 30 is partly drained from the steering wheel position deviation compensation solenoid valve 50, the steering wheel H is further turned relative to the turning amount of the car body which results in compensating the deviation.

The compensation circuit closing valve 40 can be provided apart from the steering unit 30 or incorporated into the steering unit 30.

Figure 2:
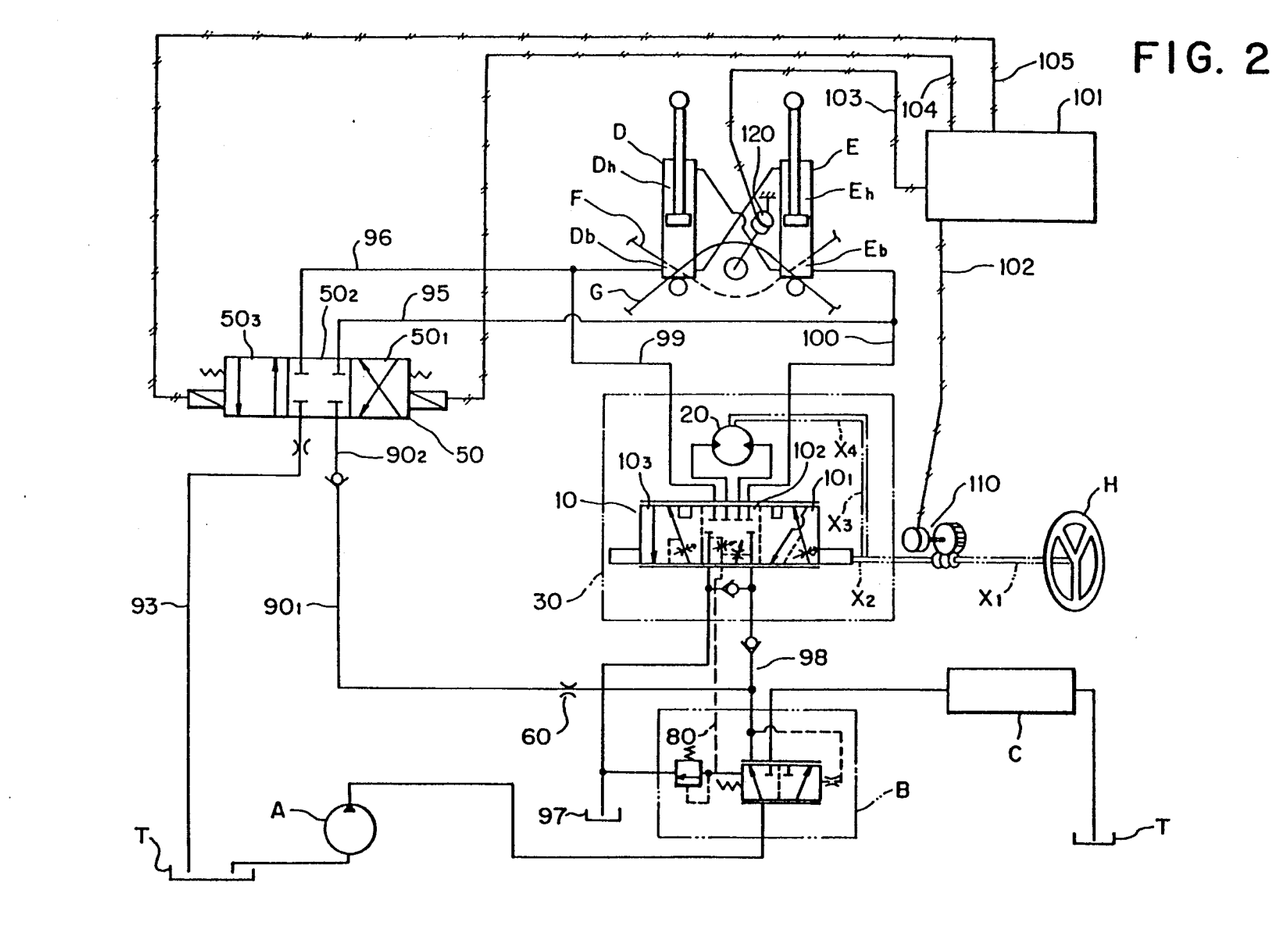
FIG. 2 is a hydraulic circuit diagram of a fully hydraulic steering system equipped with a steering wheel position compensator according to a second embodiment of the present invention.

FIG. 2 is the hydraulic circuit diagram of the fully hydraulic steering system equipped with the steering wheel position compensator according to the second embodiment of the present invention.

The numerals of the components of the hydraulic steering system according to the second embodiment are the same as those of the first embodiment and the detailed explanation thereof is omitted.

In FIG. 2, the steering wheel H, the directional control valve 10, and the metering unit 20 (a steering unit 30 is composed of the directional control valve 10 and the metering unit 20) are connected to one another by two dotted and one dash lines $X_1$, $X_2$, $X_3$ and $X_4$ and respectively controlled by the steering wheel H.

Designated at 80 is a load sensing line of a steering wheel flow control valve B, 50 is the steering wheel position deviation compensation solenoid valve, 60 is the compensation flow distribution orifice flowmeter, $90_1$, $90_2$, 93, 95, 96, 97, 98, 99, 100 are hydraulic pipes, 102, 103, 104 are electric wires, 110 is the sensor for detecting the turning angle of the steering wheel and 120 is the sensor for detecting the turning angle of the car body.

The operation of the compensation circuit according to the second embodiment is the same as that of the first embodiment as shown in FIG. 1.

When the steering handle H is not turned according to the second embodiment, the compensation oil is not supplied to the steering cylinders because of the load sensing function of the load sensing line 80 of the steering wheel flow control valve B even if the controller 101 issues the compensation signal, which is simpler according to the second embodiment. That is, the safety is maintained since the compensation is not made when the steering wheel is positioned at the neutral position. Furthermore, the structure of the controller is simplified as set forth hereunder and the manufacturing cost is sharply reduced.

(1) The compensation flow distribution valve 60 is unnecessary.

(2) Compensation circuit closing valve 40 is also unnecessary.

(3) The compensation solenoid valve 50 can have four ports instead of five ports.

INDUSTRIAL UTILIZATION

As mentioned above, according to the present invention, it is possible to solve the problem wherein the operation property of the steering wheel is deteriorated because of the deviation of the steering wheel position by insensible degrees during the straight traveling of the car body. Furthermore, also in case of frequent turning of the steering wheel rightward and leftward, it is possible to solve the problem in that the state where the steering wheel position is deviated lasts since the turning angle of the steering wheel is always compared with the turning angle of the car body and compensated in accordance with the deviation amount when the steering wheel position is deviated. Still furthermore, the deviation compensation operation does not hinder the normal steering operation.

Since the compensation circuit closing valve can be incorporated into the steering unit, additional space is unnecessary with low cost and high reliability.

When the steering wheel is not turned in case that the controller or the steering wheel position deviation compensation solenoid valve 50 are out of order, the compensation circuit closing valve 40 checks the deviation compensation oil by the compensation flow distribution valve 50, thereby solving such a problem that the car body is naturally turned even if the steering wheel is not turned, which involves the safety of the car body.

When the driver does not turn the steering wheel, the compensation oil is not supplied because of the load sensing line function of the steering wheel flow control valve B even if the controller 101 issues the compensation signal, which results in removing the compensation flow distribution valve 60 or the compensation circuit closing valve 40. As a result, the structure of the present system can be simplified, which involves a reduction of the manufacturing cost.

We claim:

1. A fully hydraulic steering system equipped with a hydraulic circuit for connecting a steering unit operable by a steering wheel to a steering cylinder for turning a car body, the steering system comprising:

a sensor for detecting a turning angle of the steering wheel;

a sensor for detecting a turning angle of the car body;

a controller for comparing outputs of these two sensors to actuate a steering wheel position deviation compensation solenoid valve in accordance with the difference between the outputs of these sensors;

a compensation flow distribution valve for supplying hydraulic oil from a steering pump to the steering wheel position deviation compensation solenoid valve; and a compensation circuit closing valve for closing a drain port of a pilot hydraulic circuit of the compensation flow distribution valve only when the steering wheel is operated by a driver thereby allowing the compensation flow distribution valve to supply the hydraulic oil to the steering wheel position deviation compensation solenoid valve.

2. A fully hydraulic steering system equipped with a hydraulic circuit for connecting a steering unit operable by a steering wheel to a steering cylinder for turning a car body comprising:

a first sensor means for detecting a turning angle of the steering wheel;

a second sensor means for detecting a turning angle of the car body;

a controller for comparing outputs of the first and second sensor means;

a steering wheel position deviation compensation solenoid valve for responding to the controller in accordance with the difference between the outputs of the first and second sensor means, the steering wheel position deviation compensation solenoid valve supplying hydraulic oil to the steering cylinder when actuated;

a steering wheel flow control valve for controlling the flow of the hydraulic oil to the steering wheel position deviation compensation solenoid valve and to the steering unit; and means coupled between the steering unit and the steering wheel flow control valve for preventing the hydraulic oil from being supplied to the steering cylinder via the steering wheel position deviation compensation solenoid valve even if a compensation signal is issued by the controller when the steering wheel is not turned by a driver.

3. A fully hydraulic steering system equipped with a hydraulic circuit for connecting a steering unit operable by a steering wheel to a steering cylinder for turning a car body, the steering system comprising:

a first sensing means for detecting a turning angle of the steering wheel;

a second sensing means for detecting a turning angle of the car body;

a controller for comparing outputs of the first and second sensing means, the controller including means for actuating a steering wheel position deviation compensation solenoid valve in accordance with the difference between the first and seconds sensing means;

a flow distribution valve for supplying hydraulic oil from a hydraulic pump to the steering wheel position deviation compensation solenoid valve, the compensation flow distribution valve including a pilot hydraulic circuit having a drain port; and a closing valve for closing the drain port when the steering wheel is operated by a driver thereby allowing the flow distribution valve to supply the hydraulic oil to the steering wheel position deviation compensation solenoid valve.

* * * * *